(12) United States Patent
Morita et al.

(10) Patent No.: US 9,546,093 B2
(45) Date of Patent: Jan. 17, 2017

(54) MINUTE DIAMOND POWDER, METHOD FOR COLLECTING THE SAME AND SLURRY COMPRISNG THE SAME IN SUSPENSION

(75) Inventors: Youichi Morita, Moriyama (JP); Tatsuya Takimoto, Toyooka (JP); Naoki Komatsu, Otsu (JP); Hiroshi Yamanaka, Oyama (JP); Hisao Shirasawa, Oyama (JP); Hiroshi Ishizuka, Tokyo (JP)

(73) Assignees: Hiroshi ISHIZUKA, Tokyo (JP); Naoki KOMATSU, Shiga (JP)

( * ) Notice: Subject to any disclaimer, the term of this patent is extended or adjusted under 35 U.S.C. 154(b) by 1409 days.

(21) Appl. No.: 12/526,076
(22) PCT Filed: Feb. 8, 2008
(86) PCT No.: PCT/JP2008/052147
§ 371 (c)(1),
(2), (4) Date: Nov. 15, 2010
(87) PCT Pub. No.: WO2008/096854
PCT Pub. Date: Aug. 14, 2008

(65) Prior Publication Data
US 2011/0052915 A1 Mar. 3, 2011

(30) Foreign Application Priority Data
Feb. 9, 2007 (JP) .................................. 2007-031367

(51) Int. Cl.
*B82Y 30/00* (2011.01)
*C01B 31/06* (2006.01)
*C09K 3/14* (2006.01)

(52) U.S. Cl.
CPC .............. *C01B 31/065* (2013.01); *B82Y 30/00* (2013.01); *C09K 3/1409* (2013.01);
(Continued)

(58) Field of Classification Search
None
See application file for complete search history.

(56) References Cited

U.S. PATENT DOCUMENTS

2009/0175776 A1* 7/2009 Saito et al. ............... 423/446
2009/0283718 A1* 11/2009 Yao .......................... C01B 31/065
252/182.12

FOREIGN PATENT DOCUMENTS

JP 2002-097387 4/2002
JP 2005-097375 4/2005
(Continued)

OTHER PUBLICATIONS

Definition load: Merriam-Webster; http://www.merriam-webster.com/thesaurus/load[verb]; Jan. 30, 2014.*
(Continued)

*Primary Examiner* — Guinever S Gregorio
(74) *Attorney, Agent, or Firm* — Stites & Harbison, PLLC; Jeffrey A. Haeberlin; James R. Hayne

(57) ABSTRACT

[Task to be Solved]
One of the principal objects of the invention is to collect minute diamond particles of $D_{50}$ of 20 nm and smaller, by MICROTRAC UPA 150, in high precision and high definition.
[Means for Solving the Task]
The minute diamond particles of the invention are recovered by a method comprising:
(1) joining or combining a hydrophilic functional group with a surface of diamond powder that comprises particles of a primary particle size of 50 nm or less, so as to impart hydrophilic nature on the surface,
(2) placing the hydrophilic diamond particles to hold in suspension in water to form a slurry,
(3) subjecting said slurry to a hyper-centrifugal process at a centrifugal force of $4 \times 10^3$ G and at the same time a centrifugal load product of $200 \times 10^3$ G·min. or more, in order to remove by depositing a fraction of coarser particles from the slurry, said load product being defined as product of centrifugal force, loaded, in G and duration of loading in minutes, where G represents the gravitational acceleration constant;
(Continued)

Dependency of $D_{50}$ particle size of collected diamond on rotation rate of ultracentrifuge for a constant loading time (4) adding cations to said slurry, whereby the diamond particles in suspension in the water are deposited.

6 Claims, 2 Drawing Sheets

(52) U.S. Cl.
CPC ........ *C09K 3/1463* (2013.01); *C01P 2004/64* (2013.01); *Y10T 428/2982* (2015.01)

(56) References Cited

FOREIGN PATENT DOCUMENTS

| | | |
|---|---|---|
| JP | 2006-225208 | 8/2006 |
| JP | 2006-273704 | 10/2006 |
| JP | 2007-001790 | 1/2007 |
| WO | WO 2006075763 A1 * | 7/2006 |

OTHER PUBLICATIONS

Definition holding: (Merriam-Webster; http://www.merriam-webster.com/dictionary/holding; Jan. 30, 2014.*
Komatsu et al.—Nano-diamond no Hyomen Kagaku Shushoku to Sono Bussei ni Ataeru Eikyo, Oct. 25, 2006, vol. 22, No. 4, pp. 24-25, New Diamond.
The International Bureau of WIPO, International Search Report for PCT/JP2008/052147, Mar. 18, 2008.
The International Bureau of WIPO, International Preliminary Report on Patentability for PCT/JP2008/052147, Aug. 11, 2009.

* cited by examiner

MINUTE DIAMOND POWDER, METHOD FOR COLLECTING THE SAME AND SLURRY COMPRISNG THE SAME IN SUSPENSION

TECHNICAL FIELD

This invention relates to a nanometer-sized diamond powder, or in particular precisely defined powder of such type having an average particle size of 20 nm or less, and a method for collecting the powder virtually as and in discrete single crystalline particles. The invention also relates to a slurry comprising such minute particles in suspension.

BACKGROUND ART

In the remarkable development in precision machining over these years, 100 nm or less minute diamond abrasives have come into use. The trend towards smaller particle sizes may call for further minute diamond abrasives of, say, 10 nm or so particles within a few years. As prospective, diamond powders of this level of size are also an object of studies for new applications including additive to lubricant, carrying medium for inspecting or medicating chemicals, etc.

Diamond products of a size under 100 nm are commercially available from, as known, such processes, first, that graphite is converted, under ultrahigh pressure and high temperature to diamond crystals, which then are crushed into smaller sizes, and second, that a carbonaceous ingredient is converted to diamond under ultrahigh pressure and high temperature produced by the detonation of a high performance explosive with high content of carbon.

The graphite converted diamonds described above include one that is single crystalline, produced statically on a hydraulic press, and another that is polycrystalline, also referred to as Du Pont type diamond, produced dynamically by explosion of an explosive chemical. The former technique can yield coarse particles of a size over 0.5 mm, while the latter often produces over 100 nm secondary particles, which are fused agglomeration of around 10 to 30 nm spheroidal primary particles, as a result of too short the pressure loading period for the crystals to grow, which lasts just a few microseconds. The diamond originating from an explosive is referred to as "detonation diamond", which is normally in the form of over 100 nm secondary particles of firm agglomeration of 4 to 10 nm primary crystallites.

Those diamonds can be reduced in size by crushing the graphite converted diamond or by chemically processing the explosive converted diamond, into particles of 10 nm or less, to be suspended in water. However no efforts have been tried for sorting and isolating diamond particles of sizes less than 10 nm or less than 20 nm.

DISCLOSURE OF INVENTION

Task to be Solved by Invention

The present applicants developed, and applied for a patent, a technique for producing size sorted diamond powder of 50 nm or less average particle size from crushed single crystalline particles of diamond. A TEM observation, however, reveals a significant proportion of finer particles in batches collected, that measure 20 nm or less and, further, 10 nm or less. Demands have increased with the progress of crushing technology that those finer fractions be sorted and collected for use.

Patent Document 1: JP-A1-2006-225208

Therefore one of the principal objects of the invention is to catch and collect those smaller fractions of diamond, as a precisely sorted, well-defined minute diamond powder in primary state with a smaller $D_{50}$ median value of, in particular, 20 nm or less by MICROTRAC UPA 150 evaluation.

BEST MODE FOR CARRYING OUT THE INVENTION

A first aspect of the invention is to provide a method for collecting minute diamond powder as and in discrete single crystal particles, having a $D_{50}$ median of 20 nm or less, with a ratio of both $D_{10}$ and $D_{90}$ to $D_{50}$ within a definite range, comprising:

(1) joining or combining a hydrophilic functional group with a surface of diamond powder that comprises particles of a primary particle size of 50 nm or less, so as to impart hydrophilic nature on the surface, (2) placing the hydrophilic diamond particles to hold in suspension in water to form a slurry, (3) subjecting said slurry to a hyper-centrifugal process at a centrifugal force of $4 \times 10^3$ G and at the same time a centrifugal load product of $200 \times 10^3$ G·min. or more, in order to remove by depositing a fraction of coarser particles from the slurry, said load product being defined as product of centrifugal force loaded, in G, and duration of loading in minutes, where G represents the gravitational acceleration constant;

(4) adding cations to said slurry, whereby the diamond particles in suspension in the water are deposited.

Another aspect is to provide a minute diamond powder that has a coordination of $D_{50}$ median of 20 nm or less, and a ratio of $D_{10}$ and $D_{90}$ to $D_{50}$ of 0.6 or greater and 1.8 or less, respectively.

In the present invention single crystalline submicron diamond can be effectively processed. It is available commonly as a product of synthesis by static high pressure conversion from non-diamond carbon and, typically, graphite and subsequent crushing into minute particles.

For the method of the invention a starting powder of diamond is first placed and dipped in a bath of concentrated or fuming sulfuric acid heated to a temperature of 150° C. at least and, in particular and preferably 250° C., in order that a hydrophilic functional group be combined or attached to the surface of the diamond particles. The bath may contain in addition one or more of nitric acid, perchloric acid, chromic acid, permanganate and nitrate, for an increase in efficiency.

Another technique is also available for imparting hydrophilicity, whereby the starting material of diamond particles is heated and treated in an atmosphere that contains oxygen at a temperature of 300° C., at least, to join or associate a hydrophilic functional group to the surface of diamond particles.

The diamond particles, minute and rendered hydrophilic as described above, are placed in dispersion and suspension in aqueous medium to form slurry, which then is size sorted in a hyper centrifugal process under a load of $4 \times 10^3$ G or more. A load duration is so selected that the product (referred hereinafter as "load product") of machine operation time and magnitude of acceleration be or over $200 \times 10^3$ G·min.

In the invention the hyper centrifugal process is employed for removing from the slurry a fraction of diamond particles less than 20 nm in $D_{50}$ median particle size. This technique has been used commonly for separation of DNAs and viruses, while least reported in other sectors. The inventors have found that it can be available and is useful for collecting diamond particles of 20 nm and less, and have successfully developed a technology of precision size sorting that can be applied down to the sizes of 10 nm.

We have conducted several experiences of centrifugal size sorting and acquired some data on the correlation between the magnitude of acceleration and the $D_{50}$ median particle size collected: at a medium (water) temperature of 20° C. and at a constant load time of 10 minutes, the $D_{50}$ size was 26.3 nm for $5.43 \times 10^3$ G, 14.4 nm for $48.9 \times 10^3$ G, 6.6 nm for $266 \times 10^3$ G and 5.4 nm for $440 \times 10^3$ G. At a constant magnitude of acceleration of $136 \times 10^3$ G, on the other hand, the $D_{50}$ size was 14 nm for 5 minutes, 10 nm for 10 minutes, 6 nm for 20 minutes and 4 nm for 40 minutes.

In the invention, in other words, diamond particles of different particle sizes can be collected from the slurry by varying the centrifugal loading duration, or operation time, at a given magnitude of acceleration. Thus in order to collect diamond particles of 20 nm or smaller $D_{50}$ size, the load product should be or over $200 \times 10^3$ G, and 10 nm or less $D_{50}$ size, $1000 \times 10^3$ G or over. It is noted here that an acceleration capacity of $4 \times 10^3$ G is necessary at minimum for securing a production throughput on an industrial scale.

In the selection of parameters of centrifugal sorting process of the invention, while the use of a large acceleration may decrease the operation time, an excessive acceleration capacity is unnecessary or unacceptable because of some difficulties involved not only in the designing and construction of the machine, but also in the operation and maintenance. The use of a common centrifugal machine too small in centrifugal capacity is not preferable, either, because an operation time unfavorably long will be necessitated, such as several hours, which may be unacceptable for an industrial process. It is essential for the designing of a centrifugal process to manage a good balance in expenditure between the equipment and operations.

Size sorted volumes of minute diamond particles are recovered from the slurry by addition of cation to it.

In the invention the evaluation of diamond particle sizes is carried out by means of MICROTRAC UPA 150, which is widely accepted for the high reproducibility in measurement of such minute particles of 10 nm and smaller. The particle sizes so evaluated can be confirmed by comparison with a particle size distribution based on an image analysis of TEM micrographs, while their magnification can be confirmed by counting on a TEM image the number of lattices observed within a unit length.

In the invention the particle size distribution is expressed in histogram of detection frequency for particle different sizes on and by MICROTRAC UPA 150, with the $D_{50}$ (median) value taken as the average size for convenience. Also the index values $D_{10}$ and $D_{90}$ are taken at 10% and 90%, respectively, on the histogram and shown together for indicating the size distribution breadth. The minute diamond powder of the invention exhibits a ratio $D_{10}/D_{50}$ of greater than 0.6 and at the same time a ratio $D_{90}/D_{50}$ of 1.8 and less, as a result of the characteristic precision centrifugal process.

The histogram of particle size distribution of the invention is based on the accumulated detection frequencies for different particle sizes, as observed and evaluated on a Microtrac dynamic light scattering centrifugal particle size analyzer, where channel particle sizes vary at a common ratio of reciprocal of fourth root of 2, with the second channel corresponding to a particle size of 5.500 μm. The part of diamond detected on each channel is referred to as fraction. $D_{50}$ median, $D_{10}$ or $D_{90}$ size for a volume of particles is calculated as the value corresponding to an accumulated detection frequency percentage of 50, 10 or 90, respectively.

When observed by the particle size analysis system as described above the minute diamond powder of the invention exhibit, with a $D_{50}$ size of as small as 20 nm, a concentrated occurrence within a small range of sizes, or over a small number of channels. In particular, the channel holding the typical particle of $D_{50}$ size shows the largest occurrence frequency, so a fraction can be obtained which holds 15% or more of the whole diamond.

While the minute powder of the invention is intended mainly for the use as an abrasive in the ultrahigh precision machining, it may be also useful as a wear-resistant material or in the sector of lubrication. For abrasive uses suitable in particular are single crystalline powders characterized with sharp edges that are commercially available as a highly crystallized product of static ultrahigh pressure conversion from non-diamond carbon and crushed into smaller particles.

The method of the invention is also applicable to so-called "poly-crystalline" diamonds that are the product of dynamic ultrahigh pressure process by detonation of explosive. This type of diamond is in the form of over 100 nm secondary particles, consisting of primary particles with a size of several, up to around 20, nm as a result of the conversion process which gives a rather short loading period of a few micro seconds. The primary particles contain a number of crystal defects and commonly take a spherical appearance and further agglomerate firmly into such secondary particles, so as to minimize the surface energy. They can be disintegrated chemically into primary particles; while the structure or shape is not suitable for abrasives uses, they may be useful for some applications as wear-resistant material and lubricant ingredient.

For each of the applications described above, the poly-crystalline diamond is disintegrated into primary particles chemically or by ultrasonic treatment before it is subjected to the sizing process of the invention. Resulting precision sized minute particles can achieve a good performance with high reproducibility.

The minute diamond of the invention can be used to form either aqueous or oil slurry of well defined precision sub-micron diamond by providing hydrophilicity or by terminating with hydrogen to give affinity to oil medium, respectively, and placing in suspension in the corresponding medium.

The minute diamond of the invention, as described above, can be used for the preparation of oil slurry by terminating the surface of diamond particles with hydrogen. It is conducted to the extent that on a Fourier Transform Infrared (FTIR) absorption spectrogram for the powder the height of the peak observed around 2800 to 3000 $cm^{-1}$ due to the CH stretching vibration exceeds that of the peak observed around 3000 to 3600 $cm^{-1}$ due to the OH stretching vibration.

The termination with chlorine can be conducted, for example this way: the size-sorted minute diamond is placed and held in a hermetic container, into which passed is chlorine gas to flow through and among the particles to get in contact. Holding the container at 150 to 500° C. inside, chlorine thus is chemically attached to the diamond surface. It is adequate that the proportion of chlorine to be attached be over 0.2% the batch mass of diamond powder. It is also effective to terminate the diamond with hydrogen in advance to the chlorine termination.

Patent Document 2: JP-A1-2007-001790

In common with other nanometer size particles, the diamond particles of the invention are very active on the surface, so in the dry state, in particular, they have a tendency to join physically or chemically to each other to form a firm agglomeration, which is difficult to broken down into primary particles by a normal technique of ultrasonic irradiation. It is thus desirable that the particles of the invention be reserved as slurry in suspension in water.

While in the trial and experimental stage there are some novel applications of the diamond particles in combination with various organic substances, which include abrasive tools, wear-resistant objects, and further for medical uses as a medicine carrier. For those uses it is useful to replace the hydrophilic groups on the diamond with hydrogen, chlorine, amine or other functional groups, since they can form a chemical bond with organic substances. Efforts are being made for joining various atoms and groups in this context.

A composite material, for example, of minute diamond particles uniformly dispersed in a resin matrix can be produced by terminating the diamond with hydrogen and dispersing it in organic solvent, which is then mixed with resin materials. Medical chemicals can be joined to the diamond by heating in a flow of ammoniac gas to associate the amino group, which can intermediate for the joining of a certain compound having a medical effect. Diamond particles with the amino group can be characterized as exhibiting an absorption peak on an FTIR spectrogram for the powder around 1600 $cm^{-1}$ due to the $NH_2$ stretching vibration.

Diamond particles can be hydrogen terminated readily by collecting the particles in suspension from a slurry that have undergone the centrifugal process, drying in the air, and heating in a flow of hydrogen gas at a temperature of 600 to 800° C.

The hydrogen terminated diamond thus obtained is used as a starting material for the preparation of OH surface modified minute diamond, by admixing with acetic acid and benzoyl peroxide, for example, and heating so as to introduce $CH_3COO-$ and $Ph-COO-$ to form an ester. The ester is further admixed with sodium hydroxide solution and held at 120° C. to hydrolyze the acetyl group.

In the process described above formic acid, propionic acid, lactic acid and valeric acid can be used to substrate for acetic acid, while azobisisobutyronitrile (AIBN) can be used as a radical initiator in the place of benzoyl peroxide.

On the other hand, the hydrogen terminated minute diamond particles, described above can be processed instead in acetonitrile by admixing and heating with benzoyl peroxide to introduce the cyano-methyl group to the surface of diamond.

EXAMPLE 1

A minute diamond powder was prepared from the starting material of single crystalline diamond, ball mill crushed product of static ultrahigh pressure synthesis. The starting material was first heat treated in mixed solution of hydrochloric and nitric acid, in order to remove by dissolving metallic impurities deriving principally from the milling balls. The diamond was then heated to around 300° C. in a 9:1 mixed solution of concentrated sulfuric acid and concentrated nitric acid, so that non-diamond carbon that coexisted was decomposed and, at the same time, hydrophilic functional groups were joined to the surface.

The diamond as so acid treated was fully washed and subjected to an elutriation in de-ionized water, whereby a fraction of 150 nm and larger was removed, and subsequently a three-staged centrifugal process, whereby a fraction of 50 nm and larger was removed by settling.

Then the effluent fluid of slurry was loaded for size sorting on a Beckman Coulter Optima TL Ultracentrifuge. The centrifugal loading time was constant at 10 minutes, while the rotation rate was varied between $10 \times 10^3$ and $100 \times 10^3$ rev./min., which correspond to accelerations of $5.4 \times 10^3$ and $543 \times 10^3$ G, respectively. The diamond particles held in suspension in the recovered slurry were size analyzed by means of MICROTRAC UPA 150 to obtain the dependency of $D_{50}$ particle size on the load. The result is shown in both Table 1 and FIG. 1.

TABLE 1

| Centrifugal Load × $10^3$ G | Rotation Rate × $10^3$ r.p.m. | Particle Size nm |
|---|---|---|
| 5.4 | 10 | 26.28 |
| 12.2 | 15 | 23.9 |
| 21.6 | 20 | 21.05 |
| 48.9 | 30 | 16.80 |
| 86.9 | 40 | 14.08 |
| 135.8 | 50 | 10.89 |
| 195.5 | 60 | 8.06 |
| 266.1 | 70 | 5.89 |
| 347.5 | 80 | 5.08 |
| 439.8 | 90 | 4.59 |
| 543 | 100 | 4.52 |

Based on the correlation as indicated in FIG. 1, a rotation rate of around 22 thousand r.p.m., or $26 \times 10^3$ G, is considered adequate for the collection of diamond with $D_{50}$ sizes of 20 nm and smaller, with the load and time product being $260 \times 10^3$ G·min. For the collection of diamond sizes of 10 nm and smaller, estimated as necessary were a rotation rate of around 54 thousand r.p.m., with a load-time product of $157 \times 10^3$ G·min.

The diamond particles held in suspension in the slurry from the centrifugal process at 50 thousand r.p.m., giving an acceleration of $136 \times 10^3$ G, showed a particle size distribution with a $D_{50}$ of 10.9 nm, $D_{10}$ of 7.9 and $D_{90}$ of 16.8 nm.

The same centrifugal separator as described above was operated at a constant rotation rate of 50 thousand r.p.m. to give an acceleration of $136 \times 10^3$ G for a loading time of 5 to 40 minutes. The result is shown in FIG. 2 in terms of the sizes of diamond particles in suspension in the slurry, with varying time from 5 to 40 minutes. It is revealed here that a diamond can be obtained with a $D_{50}$ size of around 4 nm, by operating at 50 thousand r.p.m., giving an acceleration of $136 \times 10^3$ G, for 40 minutes.

EXAMPLE 2

A polycrystalline diamond powder was used as a starting material, which were an elutriation size sorted product, having a 180 nm average particle size, of dynamic compression conversion of 30 GPa from natural graphite. As well known particles in the form of secondary state, which each consists of firmly agglomerated fused smaller primary particles, they were subjected to planetary ball milling for crushing.

Similarly to the process of example 1, the crushed powder was treated in both mixed solution of hydrochloric acid and nitric acid, and then mixed concentrated nitric acid and concentrated sulfuric acid, in order to remove by dissolution metallic impurities as well as the non-diamond carbon exposed that has come to the surface. After fully washing diamond with de-ionized water, the resulting fluid that contained diamond in suspension was loaded in a centrifuge tube, and processed at a rotation rate of 50 thousand r.p.m., giving $136 \times 10^3$ G, for 10 minutes. As a result the diamond particles in suspension were evaluated by MICROTRAC UPA 150 as 11.0 nm in $D_{50}$, and 7.9 and 16.8 nm in $D_{10}$ and $D_{90}$, respectively.

EXAMPLE 3

A detonation diamond from Russia was employed as a starting material to be treated by the method of the invention. The diamond we acquired exhibited a $D_{50}$ size of 2.9 μm by MICROTRAC UPA 150, which apparently reflected its firm agglomeration, was admixed with potassium nitrate, boiled in concentrated sulfuric acid, and then fully washed so as to be disintegrated into component particles. The particles were then loaded on a Beckman-Coulter Optima TL Ultracentrifuge, which was operated at 50 thousand r.p.m., giving $136 \times 10^3$ G, for 20 minutes, for the centrifugal process. The diamond particles in suspension in the slurry were evaluated by MICROTRAC UPA 150, and showed a $D_{50}$ of 6.0 nm, $D_{10}$ and $D_{90}$ sizes of 3.1 and 10.7 nm, respectively.

EXAMPLE 4

The slurry containing diamond particles with $D_{50}$ of 10.9 nm, obtained from the purification and centrifugal process of example 1, was admixed with a small proportion of nitric acid to deposit the diamond in agglomeration, and dried in the air by heating at 120° C.

The dry diamond powder thus prepared was placed in a ceramic boat, and heated in a flow of hydrogen gas up to 700° C. to terminate the diamond with hydrogen. On the infrared spectrogram, the absorption peak around 3000 to 3600 $cm^{-1}$ due to the hydroxyl group, began to decrease in intensity with the heating around 450° C. in hydrogen, while there was an intense absorption peak observed around 2800 to $3000^{-1}$, which is due to the CH stretching vibration. For the heating around 550° C., the two absorption peaks became almost equal in height; for the heating in hydrogen at 700° C. for an hour the hydroxyl absorption peak disappeared to show that the hydrogen termination had almost completed on the diamond surface. The hydrogen terminated diamond, thus obtained, could hold in suspension to a proportion of around 0.4 mass % in methyl-ethyl ketone.

Part of the hydrogen terminated diamond was taken and treated at a maintained temperature of 250° C. in chlorine gas. The mass increase and X-ray fluorescence analysis indicated around 3.5% of chlorine substituting for the hydrogen on the surface of diamond. The FTIR after the heating in ammoniac gas at 450° C. indicated the presence of amino group with an absorption peak around 1600 $cm^{-1}$.

EXAMPLE 5

The single crystalline particles, with a $D_{50}$ size of 9.1 nm, of hydrogen terminated diamond above were dried. 2.0 g of them were taken, put in 100 ml of acetic acid, and further admixed with 2.0 g. of benzoyl peroxide and irradiated with ultrasonic at 75° C. for an hour; thereby substituting the acetyl group for hydrogen atoms on the surface.

EXAMPLE 6

1.8 grams of the minute diamond that was surface modified with the acetyl group as above was added with 100 ml of 25% sodium hydroxide, and heated at 120° C. for 3 hours, to cause a reaction whereby acetyl groups were hydrolyzed to hydroxyl groups. As a result 1.6 grams of hydroxyl surface modified minute diamond was obtained.

INDUSTRIAL APPLICABILITY

The minute diamond powder of the invention is useful as an ultrahigh precision abrasive medium, wear-resistant material or lubricant additive.

Figure 1:
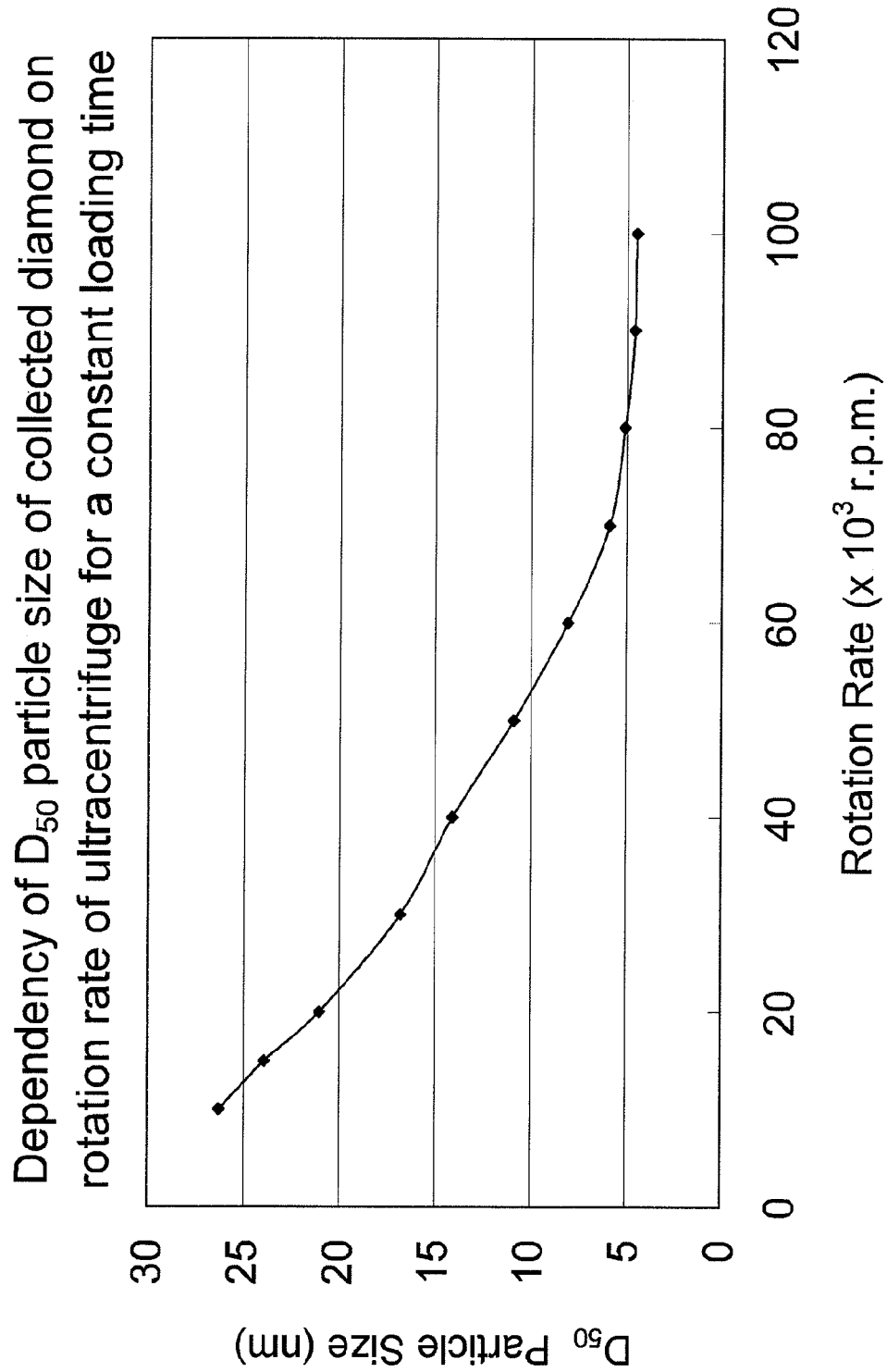
FIG. 1 The dependency of $D_{50}$ particle size on rotation rate of ultracentrifuge for the minute diamond particles recovered from a hyper centrifugal process of given time FIG. 2 The dependency of $D_{50}$ particle size on loading time by ultracentrifuge for the minute diamond particles recovered from a hyper centrifugal process under given load
Figure 2:
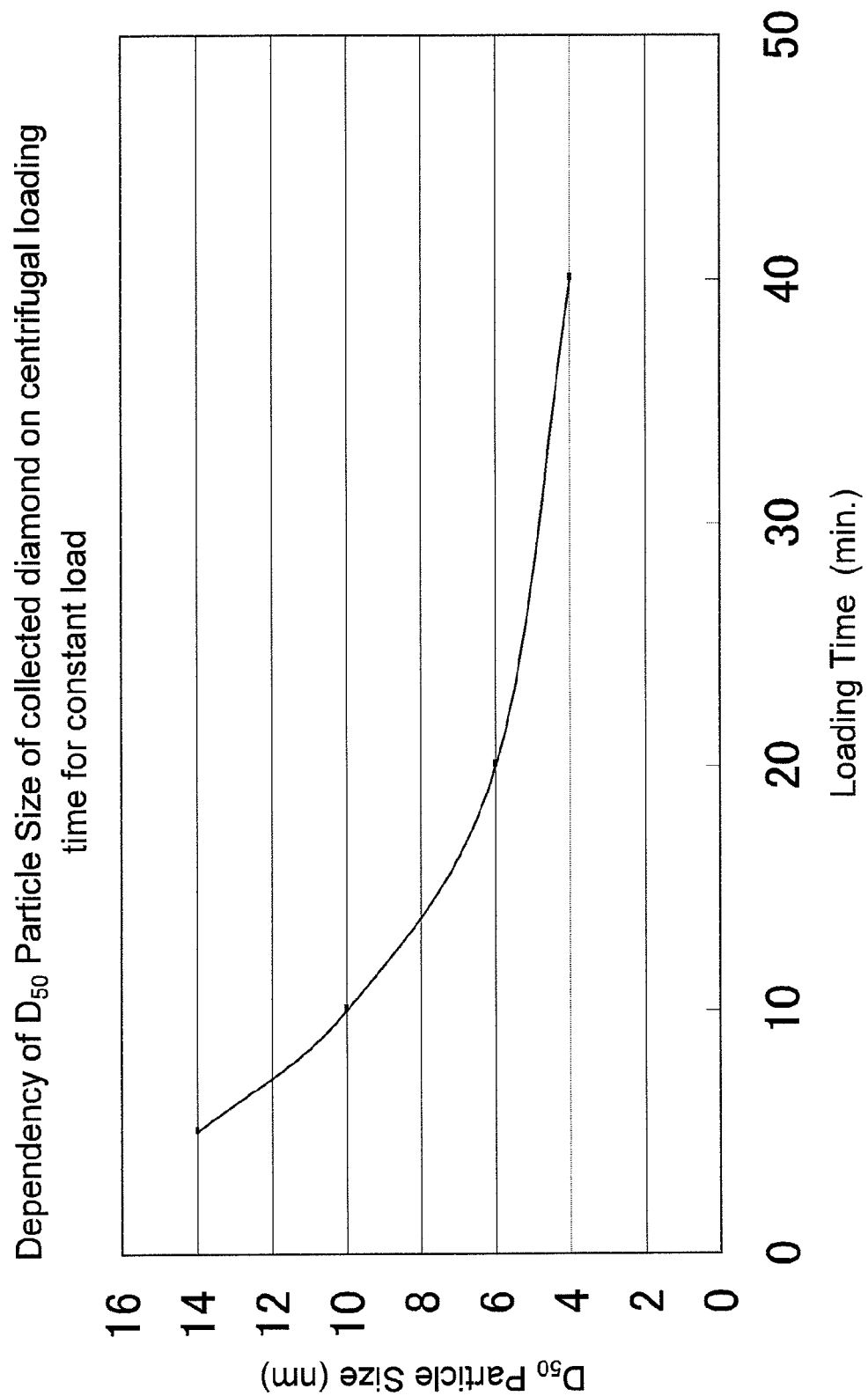

The invention claimed is:

1. A method for collecting minute diamond powder as and in discrete single crystal particles, having a $D_{50}$ median of 20 nm or less, with a ratio of either $D_{10}$ and $D_{90}$ to $D_{50}$ within a definite range, said $D_{50}$, $D_{10}$ and $D_{90}$ values obtained on a histogram of particle size distribution analysis based on individual size detection, comprising:
   (1) joining or combining a hydrophilic functional group with a surface of diamond powder that comprises particles of a primary particle size of 50 nm or less, so as to impart hydrophilic nature on the surface,
   (2) placing the hydrophilic diamond particles to hold in suspension in water to form a slurry and loading the slurry into a centrifuge,
   (3) holding all the slurry that is loaded in the centrifuge during an entire process of subjecting said slurry to a hyper-centrifugal process at a centrifugal force of at least about $4 \times 10^3$ G and at the same time a centrifugal load product of $1000 \times 10^3$ G·min. or more, in order to remove by depositing a fraction of coarser particles from the slurry, said centrifugal load product being defined as a product of centrifugal force, loaded, in G and duration of centrifugal loading in minutes, where G represents the gravitational acceleration constant;
   (4) adding cations to said slurry that is loaded in the centrifuge, whereby the diamond particles in suspension in the water are deposited,
   wherein, for a target size of D50 median of minute diamond powder as and in discrete single crystal particles a set of the centrifugal force and duration of centrifugal loading is deduced from the following list of the centrifugal load products, which are:
   $489 \times 10^3$ G·min for the size of 16.8 nm;
   $869 \times 10^3$ G·min for the size of 14.08 nm;
   $1358 \times 10^3$ G·min for the size of 10.89 nm;
   $1955 \times 10^3$ G·min for the size of 8.06 nm,
   $2661 \times 10^3$ G·min for the size of 5.89 nm,
   $3475 \times 10^3$ G·min for the size of 5.08 nm,
   $4398 \times 10^3$ G·min for the size of 4.59 nm, and
   $5430 \times 10^3$ G·min for the size of 4.52 nm.

2. The method as claimed in claim 1, in which said individual size detection is conducted with a particle size analyzer using dynamic light scattering.

3. The method as claimed in claim 1, in which said diamond powder is a single crystalline product of a static ultrahigh pressure conversion process from non-diamond carbon.

4. The method as claimed in claim 1, in which said diamond powder is a product, as disintegrated, of a dynamic ultrahigh pressure conversion process from non-diamond carbon.

5. The method as claimed in claim 1, in which said diamond powder is a product, as disintegrated, of a dynamic ultrahigh pressure conversion process from a carbon compound ingredient of an explosive utilized in said process.

6. A method for collecting minute diamond powder as and in discrete single crystal particles, having a $D_{50}$ median of 20 nm or less, with a ratio of either $D_{10}$ and $D_{90}$ to $D_{50}$ within a definite range, said $D_{50}$, $D_{10}$ and $D_{90}$ values obtained on a histogram of particle size distribution analysis based on individual size detection, comprising:
   (1) joining or combining a hydrophilic functional group with a surface of diamond powder that comprises particles of a primary particle size of 50 nm or less, so as to impart hydrophilic nature on the surface,
   (2) placing the hydrophilic diamond particles to hold in suspension in water to form a slurry and loading the slurry into a centrifuge,
   (3) holding all the slurry that is loaded in the centrifuge during an entire process of subjecting said slurry to a hyper-centrifugal process at a centrifugal force of at least about $4 \times 10^3$ G and at the same time a centrifugal load product of $1000 \times 10^3$ G·min. or more, in order to remove by depositing a fraction of coarser particles from the slurry, said centrifugal load product being defined as a product of centrifugal force, loaded, in G and duration of centrifugal loading in minutes, where G represents the gravitational acceleration constant;
   (4) adding cations to said slurry that is loaded in the centrifuge, whereby the diamond particles in suspension in the water are deposited,
wherein the duration of centrifugal loading is about 10 minutes, and
wherein:
   for a centrifugal load of about $135.8 \times 10^3$ G, minute diamond powder as and in discrete single crystal particles having a $D_{50}$ median of about 10.89 nm are collected;
   for a centrifugal load of about $195.5 \times 10^3$ G, minute diamond powder as and in discrete single crystal particles having a $D_{50}$ median of about 8.06 nm are collected;
   for a centrifugal load of about $266.1 \times 10^3$ G, minute diamond powder as and in discrete single crystal particles having a $D_{50}$ median of about 5.89 nm are collected;
   for a centrifugal load of about $347.5 \times 10^3$ G, minute diamond powder as and in discrete single crystal particles having a $D_{50}$ median of about 5.08 nm are collected;
   for a centrifugal load of about $439.8 \times 10^3$ G, minute diamond powder as and in discrete single crystal particles having a $D_{50}$ median of about 4.59 nm are collected; and
   for a centrifugal load of about $543 \times 10^3$ G, minute diamond powder as and in discrete single crystal particles having a $D_{50}$ median of about 4.52 nm are collected.

* * * * *